US010972497B1

(12) United States Patent
Pawar et al.

(10) Patent No.: US 10,972,497 B1
(45) Date of Patent: Apr. 6, 2021

(54) SYSTEMS AND METHODS FOR RECOVERING AN INFECTED ENDPOINT

(71) Applicant: Symantec Corporation, Mountain View, CA (US)

(72) Inventors: Shrikant Pawar, Mumbai (IN); Sharad Mhaske, Maharashtra (IN)

(73) Assignee: NortonLifeLock Inc., Tempe, AZ (US)

(*) Notice: Subject to any disclaimer, the term of this patent is extended or adjusted under 35 U.S.C. 154(b) by 271 days.

(21) Appl. No.: 16/138,957

(22) Filed: Sep. 21, 2018

(51) Int. Cl.
*H04L 29/06* (2006.01)
*G06F 21/56* (2013.01)
*G06F 21/57* (2013.01)
*H04W 12/12* (2021.01)
*H04L 29/08* (2006.01)
*G06F 8/61* (2018.01)
*G10L 15/22* (2006.01)
*H04W 12/10* (2021.01)

(52) U.S. Cl.
CPC .......... *H04L 63/1441* (2013.01); *G06F 8/61* (2013.01); *G06F 21/56* (2013.01); *G06F 21/57* (2013.01); *G10L 15/22* (2013.01); *H04L 63/20* (2013.01); *H04L 67/26* (2013.01); *H04W 12/10* (2013.01); *H04W 12/12* (2013.01); *G10L 2015/223* (2013.01)

(58) Field of Classification Search
CPC ..... H04L 63/1441; H04L 63/20; H04L 67/26; G06F 8/61; G06F 21/56; G06F 21/57; G10L 15/22; G10L 2015/223; H04W 12/10; H04W 12/12
See application file for complete search history.

(56) References Cited

U.S. PATENT DOCUMENTS

2014/0150100 A1* 5/2014 Gupta ................. G06F 21/316
726/22
2019/0104157 A1* 4/2019 Filar ................... G10L 15/1815

OTHER PUBLICATIONS

DolphinnAttack NPL (Year: 2017).*
Zhang et al., "DolphinAttack: Inaudible Voice Commands", Session A3: Adversarial Machine Learning, CCS'17, USA, Oct. 30, 2017, 15 pages.
Zhang, Guoming, "DolphinAttack: Inaudible Voice Command", URL: https://www.youtube.com/watch?v=21HjF4A3WE4, Aug. 31, 2017, 3 pages.

* cited by examiner

*Primary Examiner* — Tri M Tran
(74) *Attorney, Agent, or Firm* — FisherBroyles, LLP

(57) ABSTRACT

The disclosed computer-implemented method for recovering an infected endpoint may include receiving an acoustic signal having an embedded command for executing a security application at the infected endpoint, decoding the acoustic signal to obtain the embedded command, and executing the embedded command to start a security application at the infected endpoint, where the security application is operable to mitigate the infected endpoint. Various other methods, systems and computer-readable media are also disclosed.

20 Claims, 7 Drawing Sheets

SYSTEMS AND METHODS FOR RECOVERING AN INFECTED ENDPOINT

BACKGROUND

Malicious actors, such as hackers and malware writers, continually update sophisticated methodologies to attack and infect user endpoints. The attack vector of these infections is broad, but some may have a common outcome of causing a denial of service at the user endpoint by denying access to a user interface. Often these infections persist until a user performs an action such as a payment to the malicious actor or some other party.

The denial of service application may show a blocking user interface that prevents the user from performing any action on the device. Because the user is unable to perform an action on the device, it may be unusable until the denial of service application is removed. However, because the user cannot perform an action on the device, it may not be possible to remove the denial of service application without the user performing the requested action. The instant disclosure, therefore, identifies and addresses a need for systems and methods for recovering an infected endpoint.

SUMMARY

As will be described in greater detail below, the instant disclosure describes various systems and methods for recovering an infected endpoint.

In one example, a method for recovering an infected endpoint may include receiving an acoustic signal having an embedded command for executing a security application at the infected endpoint, decoding the acoustic signal to obtain the embedded command, and executing the embedded command to start a security application at the infected endpoint, where the security application is operable to mitigate the infected endpoint.

In some examples, the acoustic signal further includes at least one of additional embedded commands, metadata, and an authorization token. In some examples, the acoustic signal may be ultrasound.

In some examples, the method further includes executing a virtual assistant for activating the security application.

In some examples, the acoustic signal is received from a mobile device transducer.

In some examples, the method further includes providing credentials to a security application provider and receiving the acoustic signal in response to providing credentials to the security application provider. In some examples, the method further includes receiving the security application by way of a remote application distribution platform pushing the security application to the infected endpoint.

In some examples, the method further includes installing the security application at the infected endpoint.

In one embodiment, a system for recovering an infected endpoint may include at least one physical processor and physical memory that includes computer-executable instructions that, when executed by the physical processor, cause the physical processor to receive an acoustic signal having an embedded command for executing a security application at the infected endpoint, decode the acoustic signal to obtain the embedded command, and execute the embedded command to start a security application at the infected endpoint, where the security application is operable to mitigate the infected endpoint.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive an acoustic signal having an embedded command for executing a security application at the infected endpoint, decode the acoustic signal to obtain the embedded command, and execute the embedded command to start a security application at the infected endpoint, where the security application is operable to mitigate the infected endpoint.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
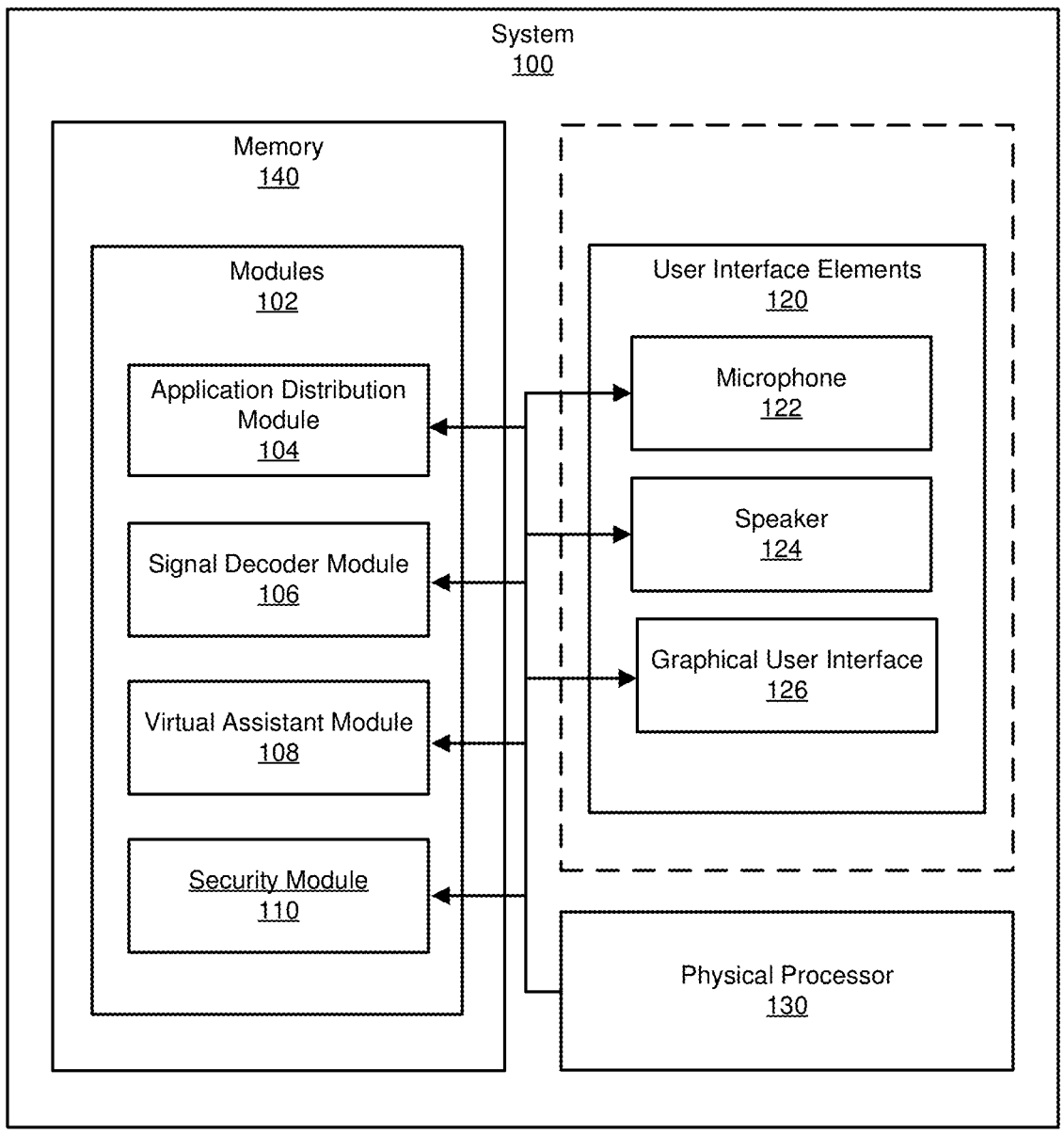
FIG. 1 is a block diagram of an example system for recovering an infected endpoint.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for recovering an infected endpoint. In some examples, an infected endpoint may have a security application executing on the infected endpoint. An acoustic signal may be received by the infected endpoint that includes an embedded command for executing the security application. The acoustic signal may be decoded to obtain the embedded command, which may then be executed to start the security application and mitigate the infected endpoint. Thus, the described systems and methods may be able to recover the infected endpoint despite the local user being unable to operate the user interface.

In addition, the systems and methods described herein may improve the functioning of a computing device by enabling a user to interact with an endpoint infected by a denial of service malware application and thereby allowing the user to mitigate the malware application. These systems and methods may also improve the field of computer security by allowing the mitigation of malware application in instances in which a device may be otherwise unusable.

Figure 2:
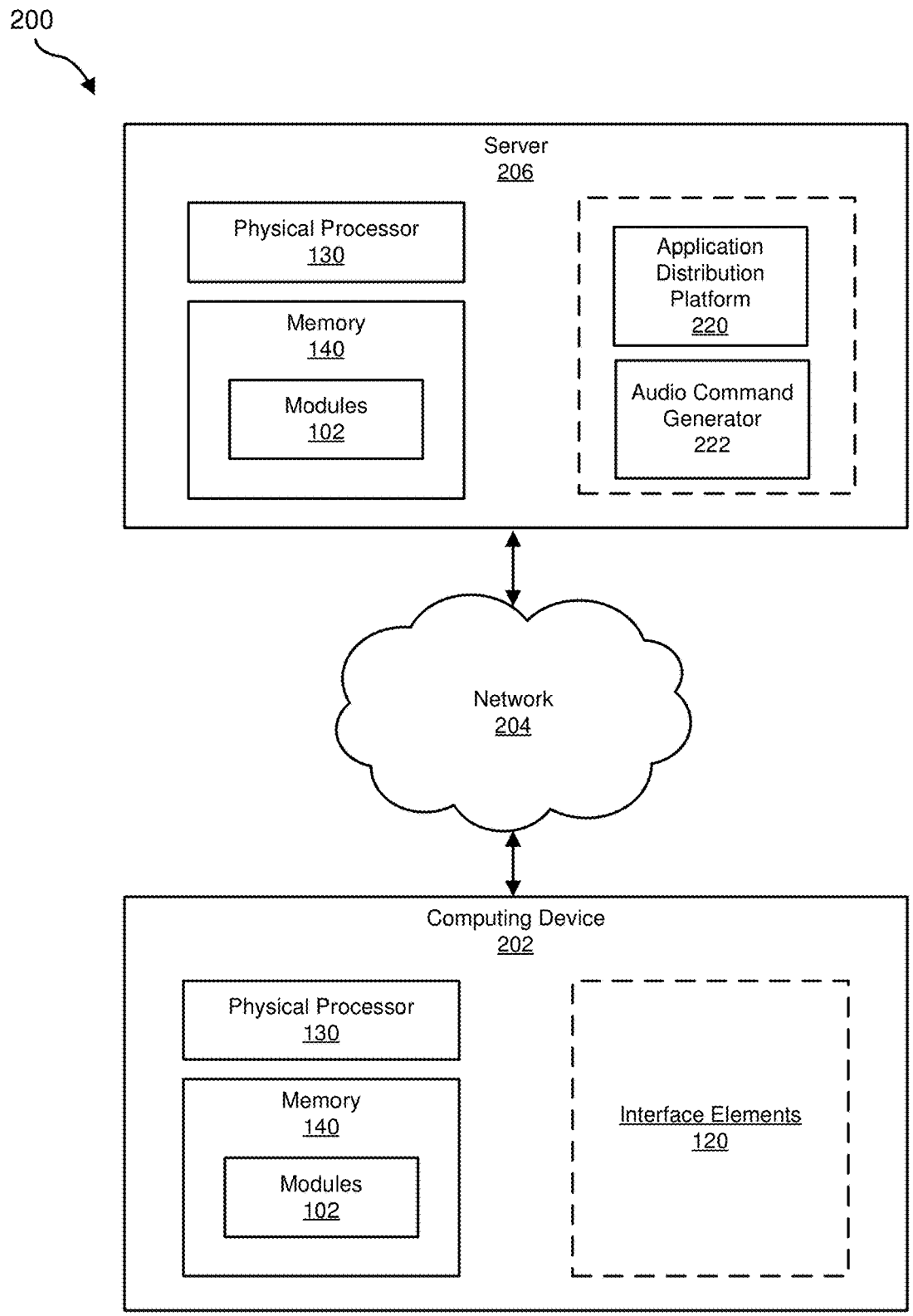
FIG. 2 is a block diagram of an additional example system for recovering an infected endpoint.

The following will provide, with reference to FIGS. 1-2, detailed descriptions of example systems for recovering an infected endpoint. Detailed descriptions of corresponding computer-implemented methods will also be provided in connection with FIG. 3. Detailed descriptions of an example mobile device having an example denial of service malware application with be provided in connection with FIG. 4. Detailed descriptions of an example endpoint receiving an acoustic signal will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for recovering an infected endpoint. As illustrated in this figure, example system 100 may include one or more modules 102 for performing one or more tasks. As will be explained in greater detail below, modules 102 may include an application distribution module 104, a signal decoder module 106, a virtual assistant module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate recovering an infected endpoint. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more user interface elements 120 such as a microphone 122, speaker 124, and graphical user interface 126. User interface elements 120 generally represents any type or form of elements for a user to interact with system 100. Additional examples of user interface elements 120 include, without limitation, keyboards, pointing devices, visual indicators, switches, buttons, and cameras.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to recover an infected endpoint. For example, and as will be described in greater detail below, one or more of modules 102 may cause computing device 202 to receive an acoustic signal having an embedded command for executing a security application. Computing device 202 may decode the acoustic signal to obtain the embedded command and execute the embedded command to start a security application operable to mitigate a denial of service malware application executing on the computing device.

Computing device 202 generally represents any type or form of computing device capable of reading computer-executable instructions. In some examples, computing device 202 may be a user end point device having a graphical user interface, such as a touchscreen interface. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of providing services such as an application distribution platform 220 for computing device 202 or an acoustic command generator 222. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Services generally represents any type or form of a function provided to a client. Examples of services include, without limitation, application distribution service, application update services, authentication services, malware characterization services, file sharing and distribution service, database services, payment services, print services, mail services, web services, and game services.

Figure 3:
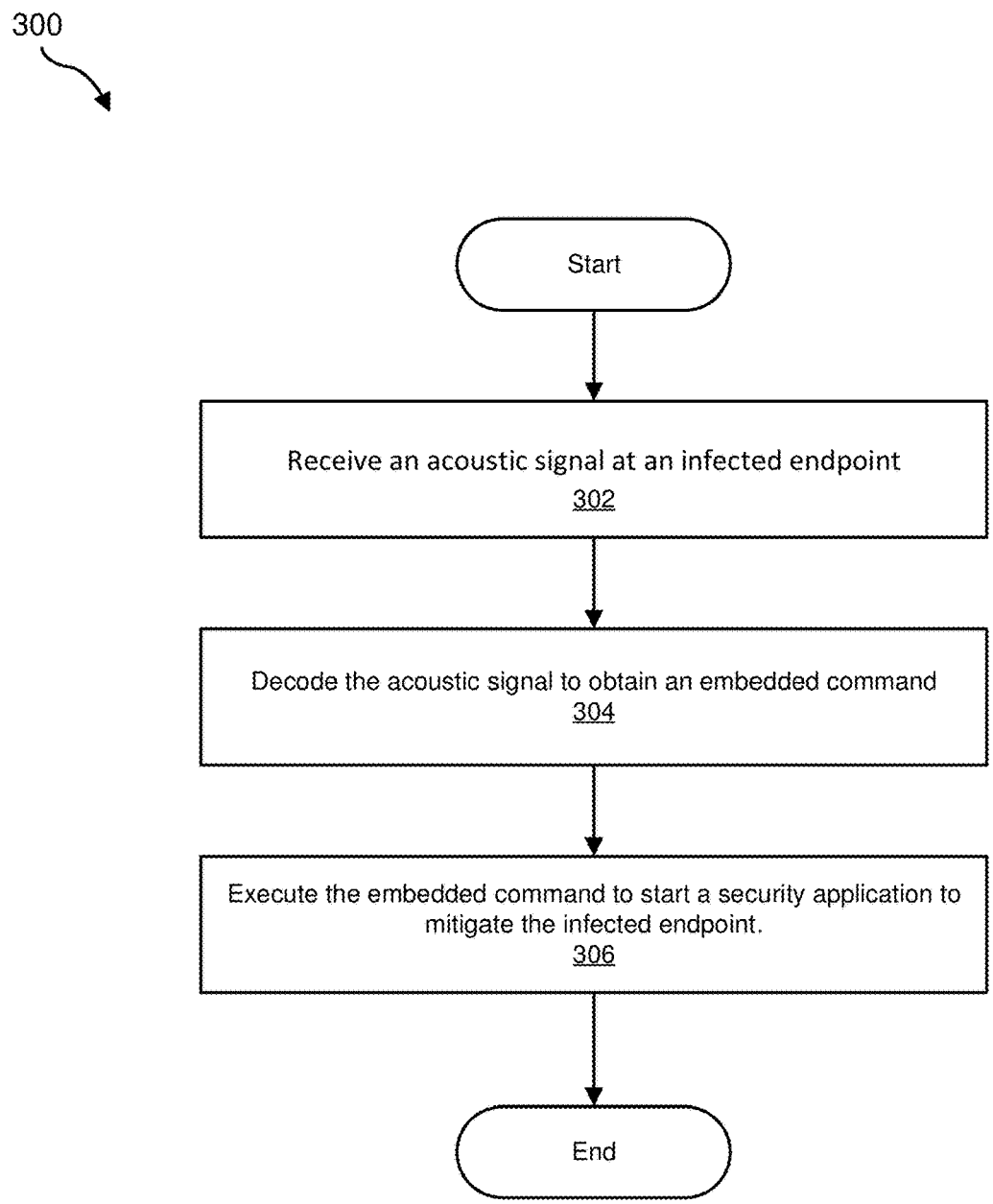
FIG. 3 is a flow diagram of an example method for recovering an infected endpoint.

FIG. 3 is a flow diagram of an example computer-implemented method 300 for recovering an infected endpoint. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

Figure 4:
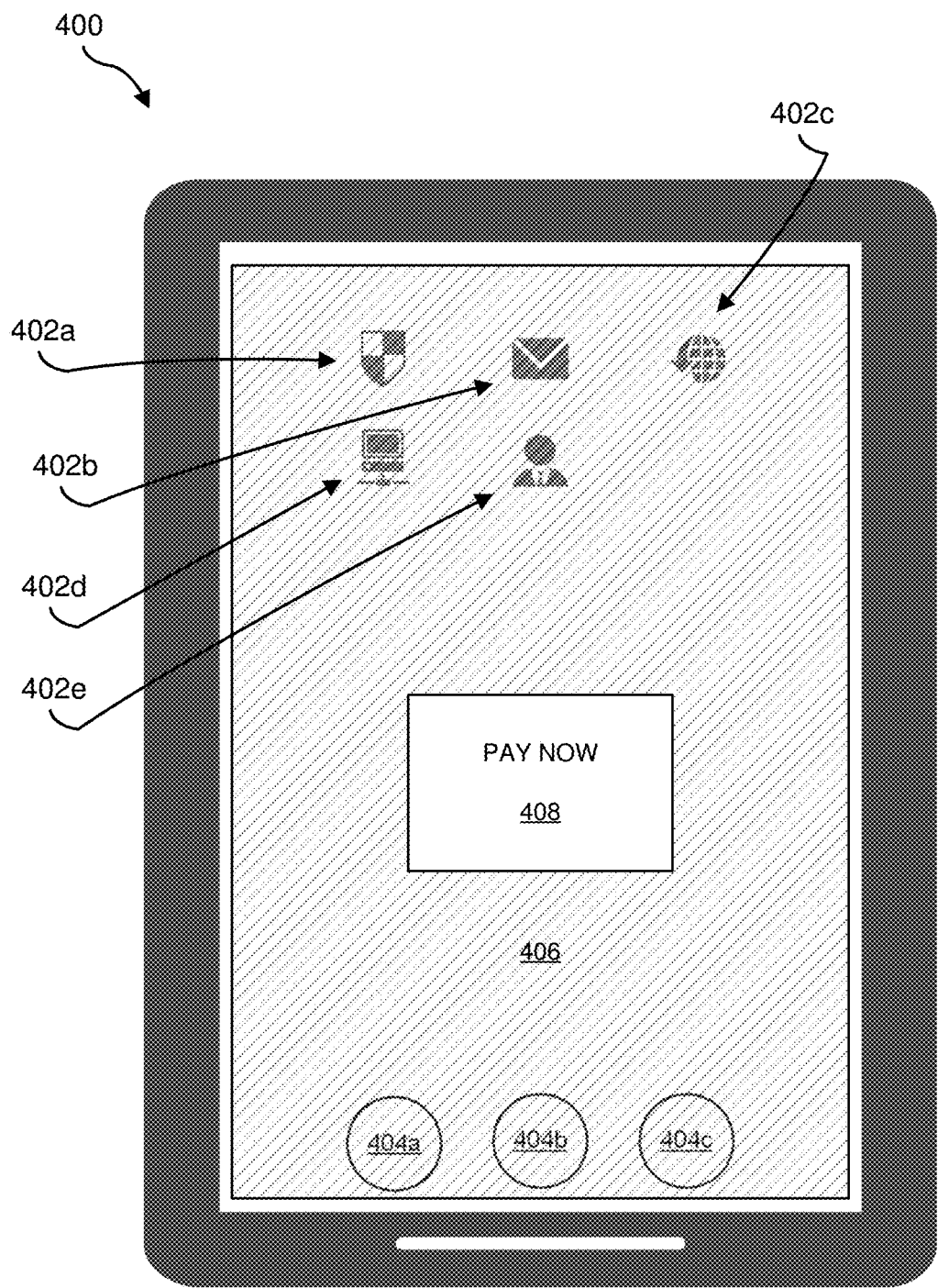
FIG. 4 is a schematic of an example mobile device having a denial of service malware application.

FIG. 4 is a schematic diagram of an endpoint in the form of a tablet computing device 400 suitable for practicing examples of the disclosure. Tablet computing device 400 may include a graphical user interface having icons 402 for selection such as security application icon 402a, mail icon 402b, internet icon 402c, network icon 402d, and user icon 402e. In use, a user may activate a related application through selection of the related icon 402. Additionally, tablet computing device 400 includes user interface elements such as a first virtual key 404a, second virtual key 404b, and third virtual key 404c. In normal user, a user may interact with the tablet computing device 400 through the use of icons 402 and virtual keys 404.

Tablet computing device 400 as shown in FIG. 4 is infected with a user interface denial of service malware application. Denial of service malware application may present its own user interface 406 obstructing the regular user interface of the tablet computing device 400. As can be seen in FIG. 4, malware application user interface 406 covers the interface elements of tablet computing device 400 rendering them inoperable. Malware application user interface 406 may include instructions for removing the malware application which may include payment to another party. Or, in some examples, malware application user interface 406 may include user interface element 408 to submit a payment directly to the other party for removal of the malware application.

Figure 5:
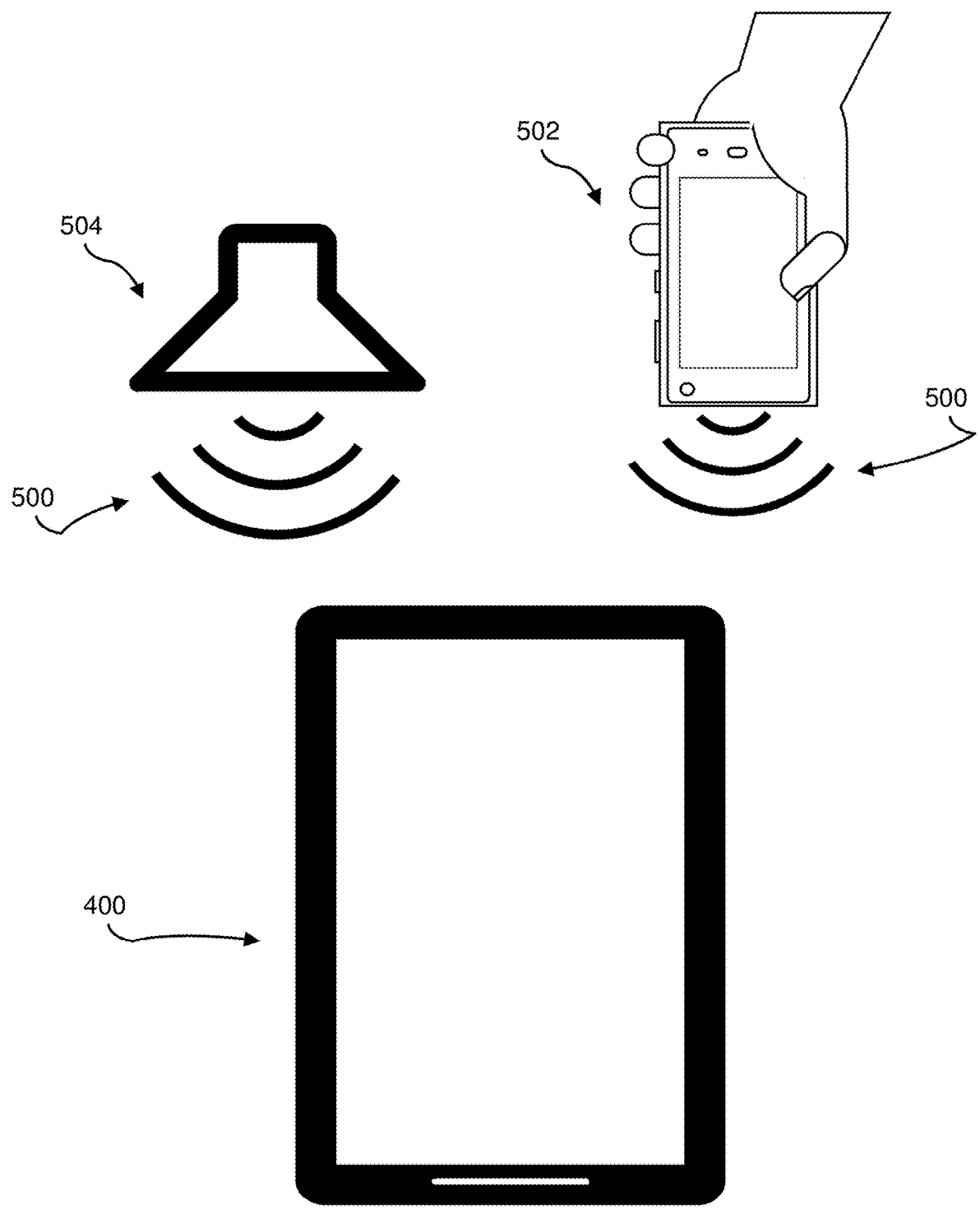
FIG. 5 is an example schematic of an infected endpoint receiving an acoustic signal.

FIG. 5 is a schematic diagram of tablet computing device 400 receiving an acoustic signal 500 from either a smart phone 502 or a transducer in the form of speaker 504.

As illustrated in FIG. 3, at step 302 one or more of the systems described herein may receive an acoustic signal at an infected endpoint. For example, microphone 122 may, as part of computing device 202 in FIG. 2, receive an acoustic signal. The acoustic signal may include an embedded command for executing a security application at computing device 202.

The term "acoustic signal," as used herein, generally refers to an acoustic waveform having information encoded therein. Examples of an acoustic signal include, without limitation, ultrasonic data over audio solutions such as those available from CUE Audio, LLC and LISNR, Inc. These ultrasonic data over audio solution embed data in audio at a frequency between 17.5 and 19.5 kilohertz and between 14.5 and 19.2 kilohertz, respectively. Other acoustic waveforms may be used, provided that they have data encoded within the waveform.

The systems described herein may perform step 302 in a variety of ways. For example, in FIG. 5 smart phone 502 may emit an acoustic signal 500 or, more generally, a speaker 504 may emit acoustic signal 500, which may then be received by a microphone of tablet computing device 400. In other examples, acoustic signal 500 may be provided by other devices having speaker 504 such as a self-contained speaker, a computer, a telephone handset, etc. In some examples, a representation of acoustic signal 500 may be recorded and stored on a device, such as smart phone 502, or in other examples, acoustic signal 500 may be generated live. For instance, in some examples, acoustic command generator 222 of server 206 may generate a representation of an acoustic signal and deliver a file containing the representation to a user for playback, or in other examples, computing device 202 may generate acoustic signal 500 based on information provided to it by server 206 and play acoustic signal. In some examples, system 100 may receive the acoustic signal at microphone 122, which may convert acoustic signal 500 to an electrical signal. In some examples, additional circuitry may be present such as filters and digital-analog converters to process the electrical signal. For example, filters may remove noise and a digital-analog converter may convert the analog electrical signal to a digital signal for further processing.

As illustrated in FIG. 3, at step 304, one or more of the systems described herein may decode the acoustic signal to obtain a command embedded in the acoustic signal. For example, signal decoder module 106, may, as part of computing device 202 in FIG. 2, decode the acoustic signal previously received by microphone 122. The decoding of the acoustic signal may result in a command for executing an application such as virtual assistant module 108, security module 110, or other application. The decoded acoustic signal may further include additional commands for interacting with the application as well as metadata and authorization tokens for the application, among other information.

As illustrated in FIG. 3, at step 306 one or more of the systems described herein may execute the embedded command to start a security application at the infected endpoint. For example, the decoded acoustic signal may contain a command for directly executing security module 110. In other examples, the decoded acoustic signal may interact with virtual assistant module 108 which then may start the security module 110.

The systems described herein may perform step 306 in a variety of ways. For example, a command from the decoded acoustic signal may directly start security module 110. In other examples, a command from the decoded acoustic signal may start virtual assistant module 108, which may then start security module 110. In either instance, security module 110 may then perform a security action on the malware, such as removing it, stopping an instance of the malware, removing the malware user interface 406, recovering the original user interface, etc. In some examples, security module 110 or virtual assistant module 108 may require additional information, such as an authorization token, security credentials, or metadata for initializing security module 110. In such examples, the additional information may be obtained from the decoded acoustic signal.

In some examples, an infected endpoint may not have security software installed prior to the infection. For example, system 100 may not have security module 110 currently installed. In such instances, a security application may be pushed to the system 100 through application distribution module 104. For example, a user may provide credentials to an online application marketplace such as Google Play, Microsoft Store, or the Apple App Store and request that a security application be pushed to system 100. System 100 may then receive the security application and install it unattended resulting in security module 110 being present on system 100.

The systems described herein may push the security application to the system point in a variety of ways. For example, with reference to FIG. 2, a user may access server 206 which includes application distribution platform 220. The user may provide credentials, select the security application, and choose to push it to the infected endpoint (computing device 202). Server 206 may then push the security application to infected endpoint by way of network 204.

In some examples, a computing device 202 other than the infected endpoint may further generate a file representing the acoustic signal. The systems described herein may generate the file in a variety of ways. For example, with reference to FIG. 2, a user may access server 206 and request generation of acoustic signal for recovering their infected device. The user may be required to authenticate through valid credentials or other means at the server 206. Once authenticated, server, through acoustic command generator 222, server 206 may generate a file representing the acoustic signal. The user may then playback the generated file to produce the acoustic signal. In some examples, the user may be local to the infected endpoint and play back the acoustic signal directly to the infected device. In other examples, the user may be remote the infected endpoint and may transmit the acoustic signal remotely, such as through a telephone communication with a local user.

In some examples, server 206 may generate information required for producing the acoustic signal and send the information to another computing device, such as computing device 202 for producing the acoustic signal. For example, server 206 may send information for producing the acoustic signal through network to computing device, which may then generate a file representing the acoustic signal or playback the acoustic signal immediately upon receipt of the information.

In some examples, application distribution platform 220 and acoustic command generator 222 may combined into a single service, such that at the time the user requests the generation of the acoustic signal, server 206 may prompt the user to push the security application to the infected device. Or conversely, at the time the user requests that the security application be pushed to the infected endpoint, the server may produce the acoustic signal for playback.

As explained in connection with the example method 300 in FIG. 3, the described systems and method may recover an endpoint infected by a denial of service malware application using acoustic signals having embedded commands for activating a security application. For example, the systems and methods may push a security application to an infected endpoint, execute the security application through the use of a command embedded in the acoustic signal, and mitigate the malware with the security application. This may be done without the use of the endpoint's standard user interface which may be unusable due to a denial of service malware application. The acoustic signal may be delivered by any device capable having a speaker output for reproducing acoustics. For example, a user may mitigate the malware using the acoustic signal, or in another example, a technical support representative could produce the acoustic signal remotely for playback over the user's phone.

Figure 6:
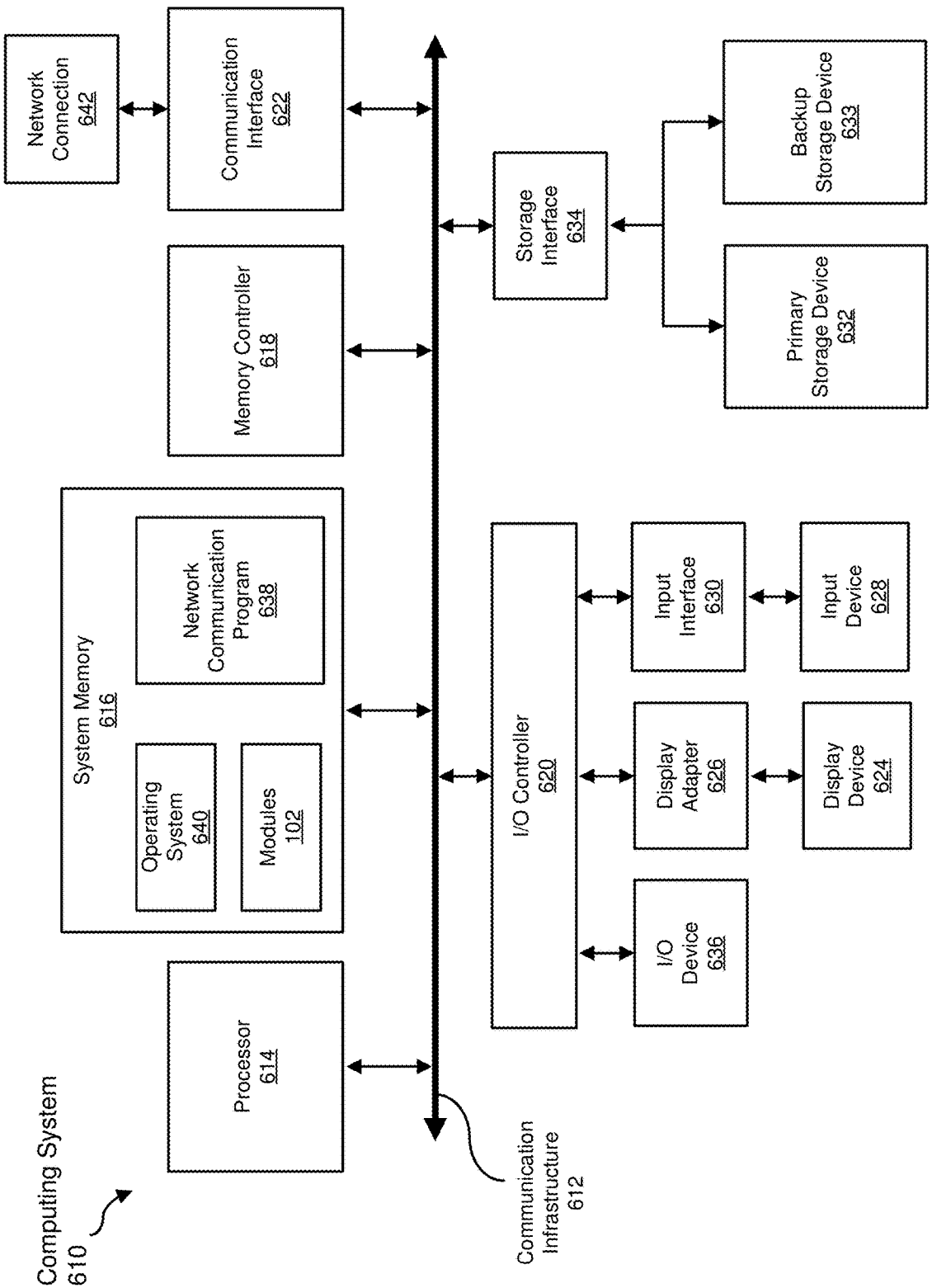
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
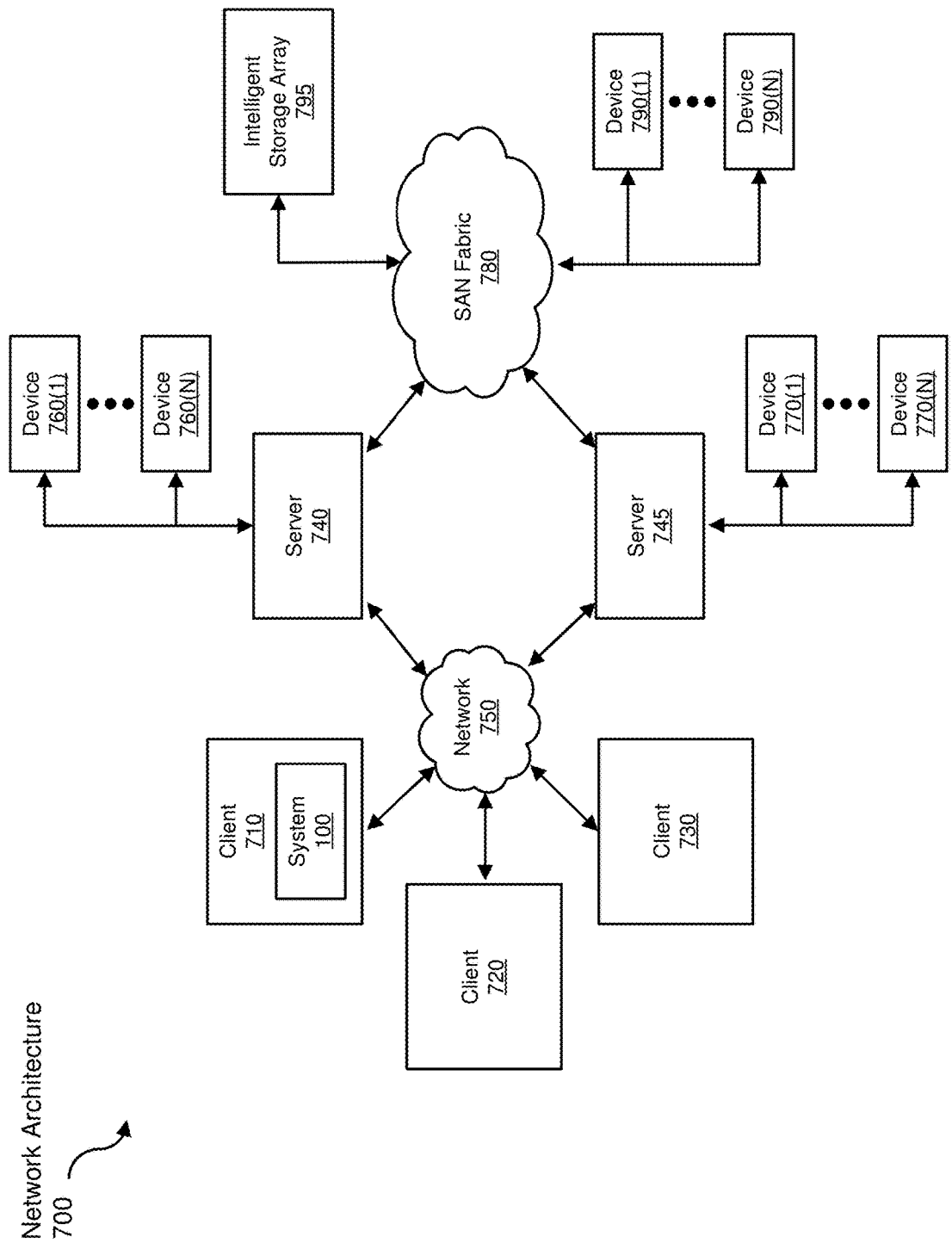
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for recovering an infected endpoint.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive acoustic signal data, transform the acoustic signal data to commands and other embedded data such as metadata or authorization tokens, output a result of the transformation to a security application, use the result of the transformation to start the security program, and perform a security action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for recovering an infected endpoint, at least a portion of the method being performed by a computing device comprising at least one processor, the method comprising:
    receiving an acoustic signal at an infected endpoint experiencing a denial of access to a user interface that persists until a user fulfills a ransom demand, the acoustic signal having encoded therein an embedded command for executing a security application, wherein the acoustic signal comprises ultrasound corresponding to an ultrasonic data over audio solution;
    decoding the acoustic signal to obtain the embedded command; and
    executing the embedded command to start a security application at the infected endpoint, the security application operable to mitigate the infected endpoint.

2. The computer implemented method of claim 1, wherein the acoustic signal further comprises at least one of additional embedded commands, metadata, and an authorization token.

3. The computer implemented method of claim 1, further comprising executing a virtual assistant for activating the security application.

4. The computer implemented method of claim 1, wherein the acoustic signal having the embedded command encoded therein is received from a mobile device transducer.

5. The computer implemented method of claim 4, further comprising:
    providing credentials to a security application provider, wherein the credentials are provided via a mobile device having the mobile device transducer; and
    receiving the acoustic signal having the embedded command encoded therein in response to providing the credentials to the security application provider.

6. The computer implemented method of claim 1, further comprising receiving the security application by way of a remote application distribution platform pushing the security application to the infected endpoint.

7. The computer implemented method of claim 6, further comprising installing the security application at the infected endpoint.

8. A system for recovering an infected endpoint, the system comprising:
    at least one physical processor;
    physical memory comprising computer-executable instructions that, when executed by the physical processor, cause the physical processor to:
    receive an acoustic signal at an infected endpoint experiencing a denial of access to a user interface that persists until a user fulfills a ransom demand, the acoustic signal having encoded therein an embedded command for executing a security application, wherein the acoustic signal comprises ultrasound corresponding to an ultrasonic data over audio solution;
    decode the acoustic signal to obtain the embedded command; and
    execute the embedded command to start a security application at the infected endpoint, the security application operable to mitigate the infected endpoint.

9. The system of claim 8, wherein the acoustic signal further comprises at least one of additional embedded commands, metadata, and an authorization token.

10. The system of claim 8, wherein the computer-executable instructions further cause the physical processor to execute a virtual assistant for activating the security application.

11. The system of claim 8, wherein the acoustic signal having the embedded command encoded therein is received from a transducer communicating with a remote acoustic signal source.

12. The system of claim 8, wherein the computer-executable instructions further cause the physical processor to:
    receive credentials from the user; and
    provide the acoustic signal to the user in response to receiving the credentials.

13. The system of claim 8, wherein the computer-executable instructions further cause the physical processor to receive the security application by way of a remote application distribution platform pushing the security application.

14. The system of claim 13, wherein the computer-executable instructions further cause the physical processor to install the security application at the infected endpoint.

15. A non-transitory computer-readable medium comprising one or more computer-executable instructions that, when executed by at least one processor of a computing device, cause the computing device to:
    receive an acoustic signal at an infected endpoint experiencing a denial of access to a user interface that persists until a user fulfills a ransom demand, the acoustic signal having encoded therein an embedded command for executing a security application, wherein the acoustic signal comprises ultrasound corresponding to an ultrasonic data over audio solution;
    decode the acoustic signal to obtain the embedded command; and
    execute the embedded command to start a security application at the infected endpoint, the security application operable to mitigate the infected endpoint.

16. The non-transitory computer-readable medium of claim 15, wherein the acoustic signal further comprises at least one of additional embedded commands, metadata, and an authorization token.

17. The non-transitory computer-readable medium of claim 15, wherein the computer-executable instructions further cause the computing device to execute a virtual assistant for activating the security application.

18. The non-transitory computer-readable medium of claim 15, wherein the computer-executable instructions further cause the computing device to receive the security application by way of a remote application distribution platform pushing the security application.

19. The non-transitory computer-readable medium of claim 18, wherein the computer-executable instructions further cause the computing device to install the security application at the infected endpoint.

20. The non-transitory computer-readable medium of claim 15, wherein the computer-executable instructions further cause the computing device to:
  receive credentials from the user; and
  provide the acoustic signal to the user in response to receiving the credentials.

\* \* \* \* \*